April 10, 1934.  J. F. HAYNES  1,954,776
BUMPER FOR AUTOMOBILES
Original Filed Oct. 26, 1931  3 Sheets-Sheet 2
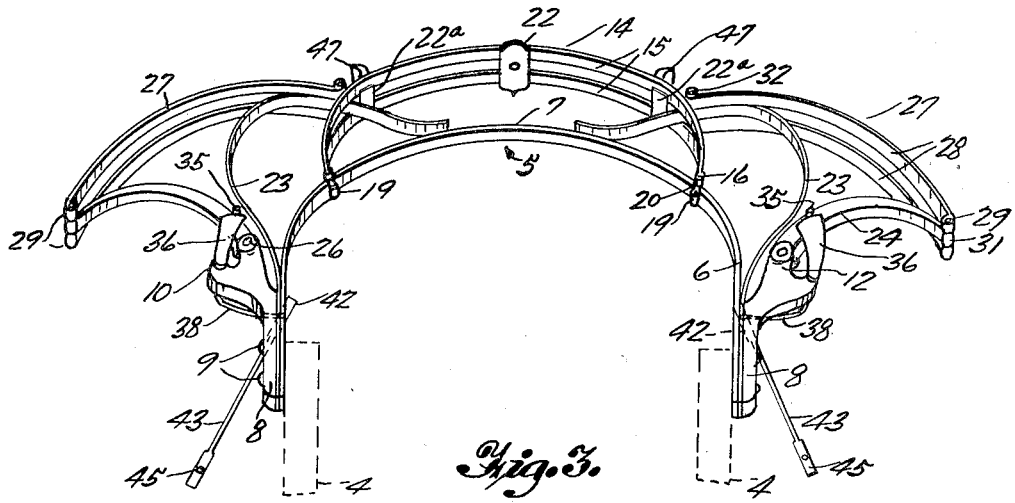
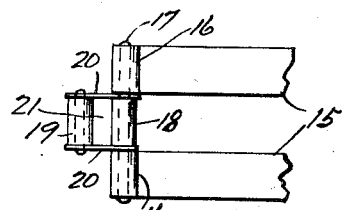
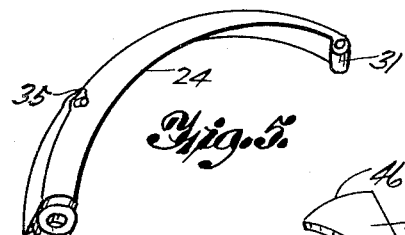
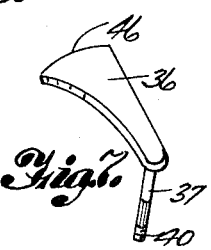
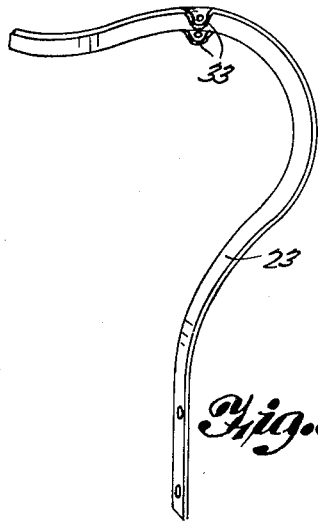
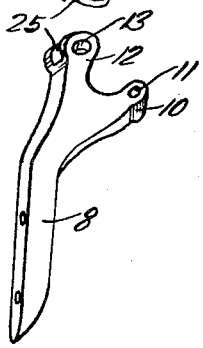
INVENTOR.
James F. Haynes
BY Adam E. Fisher
ATTORNEY.

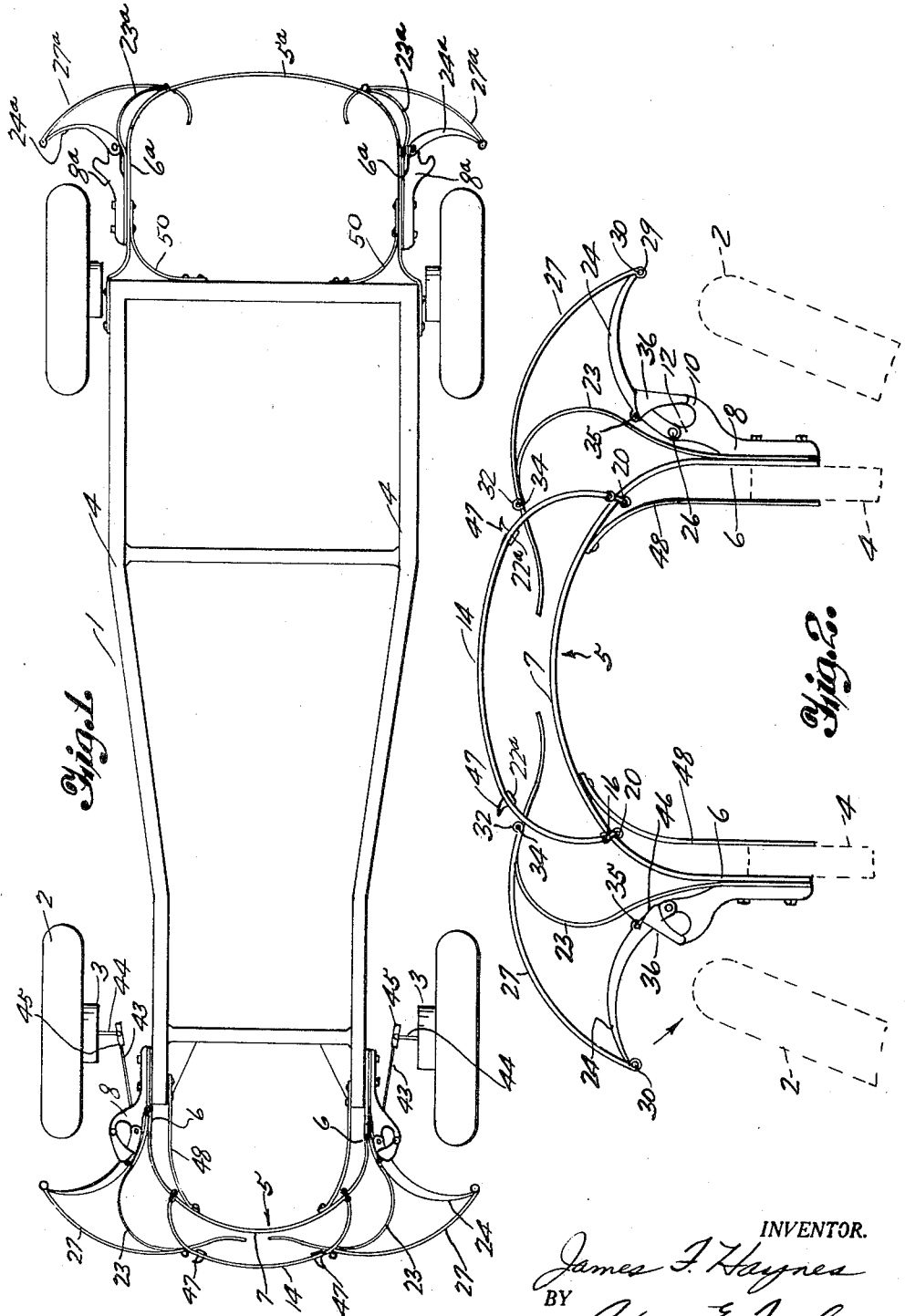

April 10, 1934.  J. F. HAYNES  1,954,776
BUMPER FOR AUTOMOBILES
Original Filed Oct. 26, 1931  3 Sheets-Sheet 3
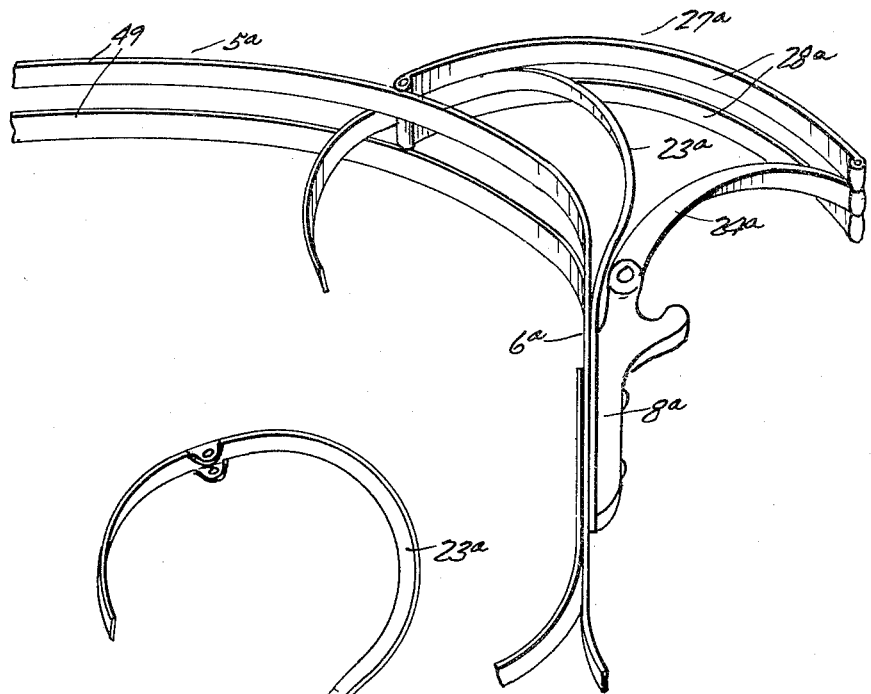
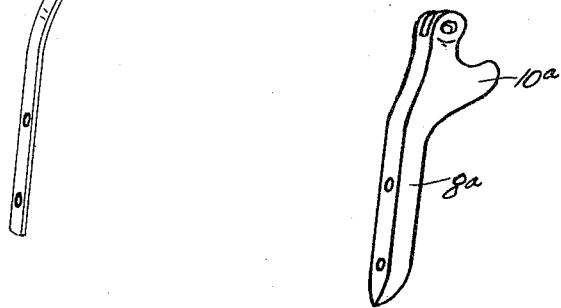
INVENTOR.
James F. Haynes
BY Adam E. Fisher
ATTORNEY.

Patented Apr. 10, 1934

1,954,776

UNITED STATES PATENT OFFICE 1,954,776

BUMPER FOR AUTOMOBILES

James F. Haynes, Shawnee, Okla., assignor of one-sixteenth to Charles Blakeley, Shawnee, Okla., and R. R. Bell, Oklahoma City, Okla.

Application October 26, 1931, Serial No. 571,119
Renewed March 13, 1933

7 Claims. (Cl. 293—55)

This invention relates to bumpers for automobiles and presents an improvement over the somewhat similar structure which is the subject matter of my copending application for United States patent filed September 25, 1931, and given Serial Number 565,000.

The main object of the present invention is to provide a bumper including end or corner sections which will automatically pivot and turn laterally in a horizontal plane upon being struck, as in a collision, whereby to swing around and protect the wheel or fender of the automobile and which in addition includes a center arched section supported by rollers on an arcuate track whereby to spring inward under the force of the impact and to travel laterally in either direction to further protect the automobile and throw off the impacting body.

Another object is to provide a bumper in which the end or corner sections are normally held rigid to receive a head on impact but which are so arranged that they are under the control of the steering mechanism of the automobile and are released to perform their aforesaid lateral swinging movement by turning the front wheels of the car to either side, this being the normal action in the attempt to avoid a collision from an angle.

Another object is to provide a bumper assembly adaptable for use on automobiles having a short running gear or chassis in which the side rails of the chassis terminate adjacent the front and rear axles, there being supporting frames extended from the ends of the chassis for supporting the bumper assemblies in operative position.

With these and other objects in view the invention resides in the novel construction and arrangement of parts as hereinafter set forth and claimed, reference being had to the accompanying drawings wherein:

Figure 1 is a plan view of the running gear or chassis of an automobile, showing bumpers mounted thereon and constructed in accordance with the present invention.

Figure 2 is an enlarged plan view of the front end of an automobile and the bumper thereon, the front wheels being shown turned to the right as in the act of avoiding a collision coming from the left, and showing the latch of the left end bumper section swung to its released position.

Figure 3 is a perspective view of the front bumper assembly on the scale of Figure 2.

Figure 4 is an enlarged detail showing the mounting of the rollers at the ends of the center bumper section.

Figures 5, 6, 7, 8 and 9 are enlarged details of a pivot link, a fastener shank, a latch, a latch arm and a leaf spring, respectively, the same comprising the main elements making up the supporting structure for one front end or corner bumper.

Figure 10 is an enlarged detail in perspective of one of the rear corner bumpers and its supporting elements.

Figure 11 is a perspective detail of the leaf spring for the bumper of Figure 10.

Figure 12 is a perspective detail of the fastener shank for the bumper of Figure 10.

Referring now more particularly to the drawings the reference character 1 designates the running gear or chassis frame, 2 the wheels and 3 the brake drum of an automobile of conventional form and of a type which employs a short running gear, it being noted that the side rails 4 thereof terminate adjacent or slightly outward of the lateral center or axle lines of the wheels.

In carrying out the present invention and in the arrangement of the front bumper assembly a U-shaped supporting frame 5 is provided, the same being in the form of a flat band bent to shape and secured by its legs 6 to the forward ends of the side rails 4 and arranged with its arcuate bight 7 disposed forwardly therefrom. Fastener shanks 8 are secured to the forward ends of said side rails 4 over the legs 6 of the frame 5 and both these shanks and the frame are secured to the side rails by bolts 9. These shanks 8 are provided with outstanding knuckles 10 faced outwardly and apertured at 11 and are provided with similar knuckles 12 inwardly of the knuckles 10 which are in turn apertured as at 13. The center section of the front bumper designated generally at 14 comprises spaced bars 15 the ends of which are curled to form eyes 16. Pins 17 are passed through these eyes 16 and through rollers 18 and similar rollers 19 are pivotally connected to these pins 17 and held in spaced relationship with the rollers 18 by shackle plates 20. A space 21 is thus left between each pair of rollers 18 and 19 to receive the frame 5 and the center bumper section 14 is thus slidably supported by said frame 5 and adapted to travel laterally thereon in either direction. The two bars 15 making up the center section 14 are held rigidly together by a center clamp 22 and spaced side clamps 22a in a conventional manner.

Interposed between the fastener shanks 8 and the legs 6 of the supporting frame 5 are the rear ends or tangs of a pair of leaf springs 23 which are extended forwardly and bent outwardly and inwardly as shown to pass freely between the spaced bars 15 of the center bumper section 14 at a point spaced some distance from the ends thereof whereby said spring will act as a support for the bumper section 14 as will be apparent. Arcuate bumper links 24 are pivotally attached to the knuckles 12 of the fastener shanks 8 and extend angularly outward therefrom, the meeting ends of the links and shanks being dovetailed as shown at 25 and connected by bolts 26. Side bumper sections 27 are provided and are formed of spaced bars 28 rolled at their outer ends to form eyes 29 through which bolts 30 are passed, said bolts passing also through eyes 31 formed in the outer free ends of the bumper links 24 whereby the said side bumpers are supported by and on the said links. In similar manner the opposite or inner ends of the bars 28 making up the side bumpers are rolled to form eyes 32 and the leaf springs 23 are provided with apertured ears 33 in alignment therewith whereby bolts 34 passed through said eyes 32 and ears 33 will connect the side bumpers and the springs.

Latch lugs 35 are provided on the upper faces of the bumper links 24 outwardly of the connection between these links and the fastener shanks 8 and latches 36 provided with pivot shafts 37 are pivotally mounted in the side knuckles 10 of the shanks by passing the said shafts 37 through the apertures 11 in the knuckles. Latch arms 38 apertured at one end at 39 to receive the shafts 37 are secured to the lower ends of these shafts by nuts (not shown) turned up on the threaded ends 40 of the shafts. The latch arms 38 are extended angularly inwardly and are bent down and provided with knobs 41 at their inner ends which enter the sockets 42 of the connecting rods 43. Arms 44 are extended inwardly from the front brake drums 3 and have knobs engaging in like manner sockets 45 at the other ends of the connecting rods 43. It will be noted that these connections between the latches 36 and the arms 44 are all angularly disposed so that any lateral movement of the front wheels 2 will result in a swinging movement of the latches. It will further be noted that the latches 36 have widened and arcuate outer margins 46 curved exactly upon co-equal radii extended from the axes of the latch shafts 37. These radii also correspond in length with the distance between said axes and the nearest faces of the latch legs 35 whereby the latches are free to rotate or swing upon their shafts 37 into and out of engagement with the said lugs 35.

While the wheels 2 are in straight away position the latches 36 rest in engagement with the lugs 35 so that any impact upon the frontal bumper assembly will be transmitted squarely back to the chassis frame 1. But when the wheels are turned to the right in the attempt to avoid a collision coming from the left as shown in Figure 2 the action of the connecting elements between the latches 36 and brake drums 3 will be to entirely release the left hand latch from the leg 35 while the right hand latch still remains in engagement with its lugs 35 as shown. The left side bumper section 27 is thus released and may swing back laterally under the impact of the collision and so cover and protect the left wheel and fender. At the same time the left end portion of the center bumper section 14 will be sprung inwardly and will travel on its rollers 18 and 19 upon the supporting frame 5, the extent of this movement being governed by the position of the left side section 27 through the engagement of the left side catch 47 with the inner end of the section 27 as will be apparent. These catches 47 are formed on and extended forwardly from the side clamps 22a. The automobile is thus protected from the force of the collision and the impact is absorbed by the resiliency of the center bumper section 14 and the leaf springs 23. The inwardly bent ends of these springs 23 close the gap between the center and side sections of the bumper assembly when either side section is swung far to one side and in addition act as shock absorber during a collision. The above action is similar when the bumper is struck from the right side and the springs 23 act to return the elements to their normal position when released. An auxiliary bracing bar 48 connecting the bight 7 of the supporting frame 5 and the front ends of the side rails 4 may be employed if desired or necessary.

The rear bumper assembly comprises a supporting frame 5a secured by its legs 6a to the rear ends of the frame side rails 4 and fastener shanks 8a are bolted to the said legs 6a. In this case the supporting frame is formed of spaced bars 49 as shown in Figure 10. Bumper links 24a are hinged to the fastener shanks 8a and carry the spaced bars 28a of the rear side bumper sections 27a and leaf springs 23a are provided and connected to the inner ends of these bumper sections. The construction and operation of these elements are identical with that of the corresponding elements of the front bumper section as hereinbefore described. The ends of the springs 23a pass inwardly between the bars 49 of the frame 5a to support the weight of the said frame, and to add to the cushioning effect of the bumper as well as to close the gap between the side bumper sections and the frame during a collision. Auxiliary supporting bars 50 aid in supporting the frame 5a. In both the front and rear bumper assemblies the outer knuckles 10 and 10a of the fastener shanks 8 and 8a act as stops to limit the lateral movement of the side bumper sections by coming in contact with the bumper links 24 and 24a as will be apparent.

While I have herein set forth a certain preferred embodiment of my invention it is understood that I may vary from the same in minor structural details so as best to construct a practical device for the purposes intended, not departing from the spirit of the invention and within the scope of the appended claims.

I claim:

1. In combination with the frame of an automobile, a supporting frame secured to the automobile frame, a center bumper section slidably mounted on the supporting frame for lateral movement thereon, and side bumper sections pivotally attached to the automobile frame and resilient means for holding the side bumper sections normally in meeting engagement with and alongside the ends of the center bumper sections.

2. In combination with the frame of an automobile, a supporting frame secured to the automobile frame, a center bumper section slidably mounted on the supporting frame for lateral movement thereon, and side bumper sections pivotally attached to the automobile frame and leaf springs secured to the automobile frame and side bumper sections and loosely engaging the said center bumper sections.

3. In combination with an automobile frame, a U-shaped supporting frame secured by its legs to the automobile frame and having an arcuate forwardly extended bight, an arcuate center bumper section, slidably connected at its ends to the said supporting frame for lateral movement thereon, and side bumper sections pivotally mounted on the automobile frame and disposed at the ends of the center bumper section.

4. In combination with an automobile frame, a supporting frame comprising a U-shaped flat band secured at its ends to the automobile frame and having a forwardly extended arcuate bight portion, an arcuate center bumper section, and spaced rollers journaled at the ends of the center bumper section and engaging the bight of the said supporting frame.

5. In combination with an automobile frame, a U-shaped supporting frame secured to the automobile frame and extended endwise therefrom, an arcuate center bumper section slidably mounted at its ends on the supporting frame, shanks attached to the automobile frame, side bumper sections pivotally mounted on the said shanks and disposed alongside the ends of the center bumper section, and leaf springs secured to the automobile frame and extended outward and connected to the said side bumper sections.

6. In combination with an automobile frame, a U-shaped supporting band secured at its ends to the automobile frame and extended at its bight endwise from the said frame, an arcuate center bumper section comprising spaced bars, spaced rollers mounted on the ends of the center bumper section and rolling on the said supporting band, shanks secured to the automobile frame adjacent the ends of the band, arcuate side bumper links pivotally attached to the shanks, side bumper sections pivotally attached at their outer ends to the said links, curved leaf springs secured to the automobile frame adjacent the shanks and extended at their free ends inward between the bars of the center bumper section, the inner ends of the side bumper sections being pivoted to the leaf springs adjacent the point at which the latter pass through the center bumper section.

7. In combination with an automobile frame, a U-shaped supporting band secured at its ends to the automobile frame and extended at its bight endwise from the said frame, an arcuate center bumper section comprising spaced bars, spaced rollers mounted on the ends of the center bumper section and rolling on the said supporting band, shanks secured to the automobile frame adjacent the ends of the band, arcuate side bumper links pivotally attached to the shanks, side bumper sections pivotally attached at their outer ends to the said links, curved leaf springs secured to the automobile frame adjacent the shanks and extended at their free ends inward between the bars of the center bumper section, the inner ends of the side bumper sections being pivoted to the leaf springs adjacent the point at which the latter pass through the center bumper section, clamps secured to the said center bumper section inwardly of the side bumper sections, and outwardly extended side bumper engaging catches formed on the said clamps.

JAMES F. HAYNES.